US012515339B2

(12) United States Patent
Szabó et al.

(10) Patent No.: US 12,515,339 B2
(45) Date of Patent: Jan. 6, 2026

(54) METHODS AND SYSTEMS FOR IMPROVING CONTROLLING OF A ROBOT

(71) Applicant: Telefonaktiebolaget LM Ericsson (publ), Stockholm (SE)

(72) Inventors: Géza Szabó, Kecskemét (HU); József Pető, Mezőkövesd (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 390 days.

(21) Appl. No.: 18/023,094

(22) PCT Filed: Aug. 26, 2020

(86) PCT No.: PCT/EP2020/073876
§ 371 (c)(1),
(2) Date: Feb. 24, 2023

(87) PCT Pub. No.: WO2022/042833
PCT Pub. Date: Mar. 3, 2022

(65) Prior Publication Data
US 2023/0311323 A1    Oct. 5, 2023

(51) Int. Cl.
*B25J 9/16* (2006.01)
(52) U.S. Cl.
CPC .................... *B25J 9/1671* (2013.01)
(58) Field of Classification Search
USPC .................................. 700/245–264
See application file for complete search history.

(56) References Cited

U.S. PATENT DOCUMENTS

| 5,855,553 A | * | 1/1999 | Tajima | A61B 34/70 600/407 |
| 10,244,208 B1 | * | 3/2019 | Deng | H04N 7/157 |

(Continued)

FOREIGN PATENT DOCUMENTS

| EP | 3733360 A1 | * | 11/2020 | B25J 19/023 |
| WO | WO-2019060626 A1 | * | 3/2019 | B25J 9/1605 |

(Continued)

OTHER PUBLICATIONS

International Search Report and Written Opinion issued in International Application No. PCT/EP2020/073876 dated May 11, 2021 (12 pages).

(Continued)

*Primary Examiner* — Jonathan L Sample
(74) *Attorney, Agent, or Firm* — Rothwell, Figg, Ernst & Manbeck, P.C.

(57) ABSTRACT

Methods and systems for controlling a robot. In one aspect, the method (1300) comprises obtaining (s1302) first input information associated with a first simulation environment to which a first level of realism is assigned and obtaining (s1304) second input information associated with a second simulation environment to which a second level of realism is assigned. The first level of realism is different from the second level of realism. The method further comprises associating (s1306) the first input information with a first realism value representing the first level of realism; and associating (s1308) the second input information with a second realism value representing the second level of realism. The method further comprises modifying (s1310), based on the associated first input information and the associated second input information, one or more parameters of a machine learning (ML) process used for controlling the robot.

20 Claims, 15 Drawing Sheets

(56) References Cited

U.S. PATENT DOCUMENTS

| | | | |
|---|---|---|---|
| 10,792,810 B1* | 10/2020 | Beckman | B25J 9/163 |
| 11,055,356 B2* | 7/2021 | Ritchey | G06N 20/00 |
| 11,461,589 B1* | 10/2022 | Bai | G06N 3/08 |
| 11,494,632 B1* | 11/2022 | Bai | G06N 3/09 |
| 12,122,053 B2* | 10/2024 | Chen | B25J 9/163 |
| 2014/0200863 A1* | 7/2014 | Kamat | E02F 9/245 703/1 |
| 2018/0281193 A1* | 10/2018 | Favis | G06T 19/20 |
| 2018/0349527 A1* | 12/2018 | Li | G06N 3/08 |
| 2019/0325574 A1* | 10/2019 | Jin | G06V 10/751 |
| 2020/0030979 A1* | 1/2020 | Bank | B25J 13/08 |
| 2020/0101610 A1* | 4/2020 | Thackston | B25J 9/1612 |
| 2020/0259896 A1* | 8/2020 | Sachs | H04L 67/12 |
| 2020/0279134 A1* | 9/2020 | Bousmalis | G06N 3/006 |
| 2020/0376675 A1* | 12/2020 | Bai | G06T 5/94 |
| 2020/0398435 A1* | 12/2020 | Okura | B25J 9/1671 |
| 2021/0101286 A1* | 4/2021 | Lee | B25J 13/08 |
| 2021/0107157 A1* | 4/2021 | Bai | B25J 9/1692 |
| 2021/0170603 A1* | 6/2021 | Kotlarski | B25J 13/006 |
| 2021/0181728 A1* | 6/2021 | Yamaguchi | G05B 19/41885 |
| 2022/0024037 A1* | 1/2022 | Lee | B25J 13/08 |
| 2022/0032951 A1* | 2/2022 | Luo | B60W 60/0011 |
| 2022/0292543 A1* | 9/2022 | Henderson | G06Q 30/0252 |
| 2022/0317659 A1* | 10/2022 | van Baar | B25J 13/088 |
| 2022/0331955 A1* | 10/2022 | Solowjow | G06N 20/00 |
| 2024/0118667 A1* | 4/2024 | Rao | B25J 9/163 |

FOREIGN PATENT DOCUMENTS

| | | | | |
|---|---|---|---|---|
| WO | WO-2019070790 A1 * | 4/2019 | | G06F 11/261 |
| WO | 2020/098962 A1 | 5/2020 | | |

OTHER PUBLICATIONS

S. Levine, P. Pastor, A. Krizhevsky, and D. Quillen, "Learning Hand-Eye Coordination for Robotic Grasping with Deep Learning and Large-Scale Data Collection," CoRR, vol. abs/1603.02199, 2016. Available: http://arxiv.org/abs/1603.02199 (12 pages).

P. Gawlowicz and A. Zubow, "ns3-gym: Extending OpenAI Gym for Networking Research," CoRR, vol. abs/1810.03943, 2018. [Online]. Available: http://arxiv.org/abs/1810.03943 (6 pages).

OpenAI and M. A. et. al, "Learning Dexterous In-Hand Manipulation," CoRR, vol. abs/1808.00177, 2018. [Online]. Available: http://arxiv.org/abs/1808.00177 (27 pages).

X. Ren, J. Luo, E. SolowjoW, J. A. Ojea, A. Gupta, A. Tamar, and P. Abbeel, "Domain randomization for active pose estimation," in 2019 International Conference on Robotics and Automation (ICRA), 2019, pp. 7228-7234 (7 pages).

P. Moritz, R. Nishihara, S. Wang, A. Tumanov, R. Liaw, E. Liang, M. Ellbol, Z. Yang, W. Paul, M. I. Jordan, and I. Stoica, "Ray: A Distributed Framework for Emerging AI Applications," in 13th Usenix Symposium on Operating Systems Design and Implementation (OSDI 18). Carlsbad, CA: Usenix Association, Oct. 2018, pp. 561-577. [Online]. Available: https://www.usenix.org/conference/osdi18/presentation/moritz (18 pages).

G. Szabo, S. Racz, N. Reider, and J. Peto, "Digital twin: Network provisioning of mission critical communication in cyber physical production systems," In Proc., The IEEE International Conference on Industry 4.0, Artificial Intelligence, and Communications Technology, Jul. 2019. (3 pages).

"URSim," 2019. [Online]. Available: https://www.universal-robots.com/download/?option=28545#section 16632 (6 pages).

G. Szabo, S. Racz, J. Peto, and R. R. Aschoff, "On The Effects of The Variations In Network Characteristics In Cyber Physical Systems," In Proc., 31st European Simulation and Modelling Conference, Oct. 2017. (6 pages).

M. Mezzavilla, M. Zhang, M. Polese, R. Ford, S. Dutta, S. Rangan, and M. Zorzi, "End-to-end simulation of 5g mmwave networks," IEEE Communications Surveys Tutorials, vol. 20, No. 3, pp. 2237-2263, thirdquarter 2018. (27 pages).

"Show / manipulate traffic control settings," 2019. [Online]. Available: http://man7.org/linux/man-pages/man8/tc.8.html (16 pages).

J. Schulman, F. Wolski, P. Dhariwal, A. Radford, and O. Klimov, "Proximal policy optimization algorithms," CoRR, vol. abs/1707.06347, 2017. (12 pages).

"PPO implementation in RLlib," 2020. [Online]. Available: https://github.com/ray-project/ray/blob/master/rllib/agents/ppo/ppo.py (1 page).

"UR modern driver," 2020. [Online]. Available: https://github.com/ros-industrial/ur_modern_driver (7 pages).

"pyroute2," 2020. [Online]. Available: https://pypi.org/project/pyroute2/ (9 pages).

S. Racz, G. Szabo, and J. Peto, "Performance evaluation of closed-loop industrial applications over imperfect networks," Infocommunications Journal, vol. 11, No. 2, pp. 32-28, Jun. 2019. (7 pages).

"ARIAC scoring," 2019. [Online]. Available: https://bitbucket.org/osrf/ariac/wiki/2019/scoring (2 pages).

G. Brockman et al., "Openai gym," CoRR, vol. abs/1606.01540, 2016. [Online]. Available: http://arxiv.org/abs/1606.01540 (4 pages).

* cited by examiner

Deployment Options

| Robot Cell Deployment Options | Real-time Execution Req't on Edge Cloud | Level of Realism |
|---|---|---|
| Digital Twin with real UR5 hardware | O / X | 3 |
| Digital Twin with URSim | O / O | 2 |
| Physical Simulator (Gazebo) | O | 2 |

| Radio Connectivity Options | Real-time Execution Req't on Edge Cloud | Level of Realism |
|---|---|---|
| 5G URLLC Prototype | X | 4 |
| Network Simulator | X | 3 |
| tc qdisc add dev eth0 Root netem delay 20 ms Linux Traffic Control | O | 2 |
| FIFO robot_hw_sim_latency Gazebo Latency Plug-in | X | 1 |

FIG. 5

Algorithm 1 PPO with level of realism, Actor-Critic Style

---

Require: robot deployment set: $D = \{DT, URSim, Gazebo\}$, communication set: $C = \{5G, tc, latency\_plugin\}$
Ensure: $\theta$
  for iteration=1,2,... do
    for actor=1,2,...,N do
      Run policy $\pi_{\theta_{old}}$ in environment $E_{d_a, c_a}$ in which $d_a \in D, c_a \in C$ for T timesteps
      Compute advantage estimates $\hat{A}_1, ..., \hat{A}_T$
    end for
  end for
  Optimize surrogate $L_{E_{d_a, c_a}}$ wrt $\theta$, with $K$ epochs and minibatch size $M \leq NT$
  $\theta_{old} \leftarrow \theta$

METHODS AND SYSTEMS FOR IMPROVING CONTROLLING OF A ROBOT

CROSS REFERENCE TO RELATED APPLICATIONS

This application is a 35 U.S.C. § 371 National Stage of International Patent Application No. PCT/EP2020/073876, filed 2020 Aug. 26.

TECHNICAL FIELD

Disclosed are embodiments related to methods and systems for improving controlling of a robot.

BACKGROUND

A robot is a machine capable of carrying out a series or one or more actions. A robot may be programmed to perform the action(s) automatically and/or in response to one or more commands received from a controller (e.g., a computer, a server, etc.).

FIG. 1 shows a system 100 for controlling a robot 102 in Industry 3.0. The system 100 comprises the robot 102 and a robot controller 104. A program for controlling the robot 102 may be stored in the robot controller 104 or may be stored in a storage medium 106 (e.g., a USB storage) and provided to the robot controller 104 by connecting the storage medium to the robot controller 104. In other words, in the system 100, the robot 102 is controlled based on preprogrammed control. Using the program, the robot controller 104 may perform various calculations related to controlling the robot 102. For example, such calculations include calculating a velocity at which the robot 102 is to move, a distance the robot 102 is to move, and/or a moving path along which the robot 102 is to move. After performing the calculations, the robot controller 104 may transmit to the robot 102 signals via connector(s) 108. The signals transmitted to the robot 102 via the connector(s) 102 may include power, servo control commands (i.e., the commands for controlling a servo—a small device having an output shaft), analogue commands, and/or 2.4 kHz control commands.

FIG. 2 shows a system 200 for controlling the robot 102 in Industry 4.0. The system comprises the robot 102, the robot controller 104, and a cloud-based controller 206. The cloud-based controller 206 may be a single physical entity or a plurality of distributed physical entities connected to each other. The number of the robot 102 and the number of the robot controller 104 are shown in FIG. 2 for illustration purpose only, and they do not limit the embodiments of this disclosure in any way. In the system 200, a program for controlling the robot 102 may be stored in the cloud-based controller 206. Using the program, the cloud-based controller may perform various calculations related to controlling the robot 102 in real-time and provide to the robot controller 104 command(s) for controlling the robot 102 in real-time. For example, as the cloud-based controller 206 calculates a velocity at which the robot 102 is to move, a distance the robot 102 is to move, and/or a moving path along which the robot 102 is to move, the cloud-based controller 206 may transmit to the robot controller 104 command(s) corresponding to such calculation via a communication channel 208.

Also as the robot controller 104 controls the robot 102, the robot controller 104 may transmit to the cloud-based controller 206 message(s) regarding the controlling of the robot 102 via the communication channel 208. For example, the message(s) may include information indicating the status of the robot 102. The status of the robot 102 may include the current position of the robot and whether a desired result has been accomplished by the command(s) provided from the cloud-based controller 206 to the robot controller 104.

Conventionally, the program for controlling the robot 102 is a sequence of logics written by human programmer(s). As the robot is used in fields involving complicated tasks, however, the amount of input data to be processed by the program 102 increases and identifying patterns and/or trends of such large amount of input data may be too difficult for the human programmer(s).

SUMMARY

1. Summary of the Embodiments

The embodiments of this disclosure provide methods and/or systems for improving RL algorithms for remotely controlling a robot. The improved RL algorithms may provide high speed and may associate with high reality levels.

Specifically, some embodiments of this disclosure provide a method which associates inputs (e.g., trajectories) generated for a machine learning (e.g., a reinforcement learning) with a level of realism of a simulation environment in which the inputs were created. The associated inputs may be used to modify one or more parameters of the policy learning algorithm.

In one aspect there is provided a method for controlling a robot. The method comprises obtaining first input information associated with a first simulation environment to which a first level of realism is assigned and obtaining second input information associated with a second simulation environment to which a second level of realism is assigned. The first level of realism is different from the second level of realism. The method further comprises associating the first input information with a first realism value representing the first level of realism and associating the second input information with a second realism value representing the second level of realism. The method further comprises modifying, based on the associated first input information and the associated second input information, one or more parameters of a machine learning (ML) process used for controlling the robot.

In another aspect there is provided a method for training a machine learning (ML) algorithm. The method comprises (i) receiving input information associated with a simulation environment to which a level of realism is assigned and (ii) associating the input information with a realism value representing the level of realism. The method further comprises (iii) based on the associated input information, modifying one or more parameters of the ML algorithm, (iv) based on the modified one or more parameters of the ML algorithm, controlling a robot, and (v) evaluating a performance of the robot. The method further comprises (vi) based on a result of the evaluation of the performance of the robot, determining whether to repeat the steps (i)-(v).

In another aspect there is provided a computer program comprising instructions which when executed by processing circuitry causes the processing circuitry to perform any of the methods described above.

In another aspect there is provided an apparatus for controlling a robot. The apparatus is configured to obtain first input information associated with a first simulation environment to which a first level of realism is assigned and obtain second input information associated with a second simulation environment to which a second level of realism is assigned. The first level of realism is different from the second level of realism. The apparatus is further configured to associate the first input information with a first realism value representing the first level of realism and associate the second input information with a second realism value representing the second level of realism. The apparatus is further configured to modify, based on the associated first input information and the associated second input information, one or more parameters of a machine learning (ML) process used for controlling the robot.

In another aspect, there is provided an apparatus for training a machine learning (ML) algorithm. The apparatus is configured to: (i) receive input information associated with a simulation environment to which a level of realism is assigned and (ii) associate the input information with a realism value representing the level of realism. The apparatus is further configured to (iii) based on the associated input information, modify one or more parameters of the ML algorithm, (iv) based on the modified one or more parameters of the ML algorithm, control a robot, and (v) evaluate a performance of the robot. The apparatus is further configured to (vi) based on a result of the evaluation of the performance of the robot, determine whether to repeat the steps (i)-(v).

The embodiments of this disclosure provide one or more of the following advantages: (1) simulators can still be used to do the exploratory phases during policy learning to keep the parallelism of the workers maximum; (2) the system can support various levels of DT realizations and feed them to the RL system; and (3) the learned policies are close to the one obtained from fully HW realized scenarios, and thus transferring the learned policy to the real HW is straightforward.

BRIEF DESCRIPTION OF THE DRAWINGS

The accompanying drawings, which are incorporated herein and form part of the specification, illustrate various embodiments.

FIG. 5 shows deployment options for robot cell and network connectivity.

FIG. 7 shows an extended PPO algorithm.

DETAILED DESCRIPTION

In the embodiments of the present application, a machine learning (ML) is used to build one or more programs (i.e., policy/model) for controlling the robot 102. For example, in the system 200, the ML models may be trained and stored in the cloud-based controller 206.

As the use of the robot expands to dynamic environments, the ML model must increasingly operate and react to changes in such dynamic environments and take sequences of actions to accomplish long-term goals. Furthermore, the ML model must aim not only to exploit the data gathered, but also to explore the space of possible actions.

One type of ML that satisfies the aforementioned requirements is Reinforcement Learning (RL). The RL is a ML that can continuously operate within an uncertain environment based on delayed and limited feedback.

The central goal of an RL is to learn a policy—a mapping from the state of the environment to a choice of action—that yields effective performance (e.g., winning a game or piloting a drone) over time.

Figure 4:
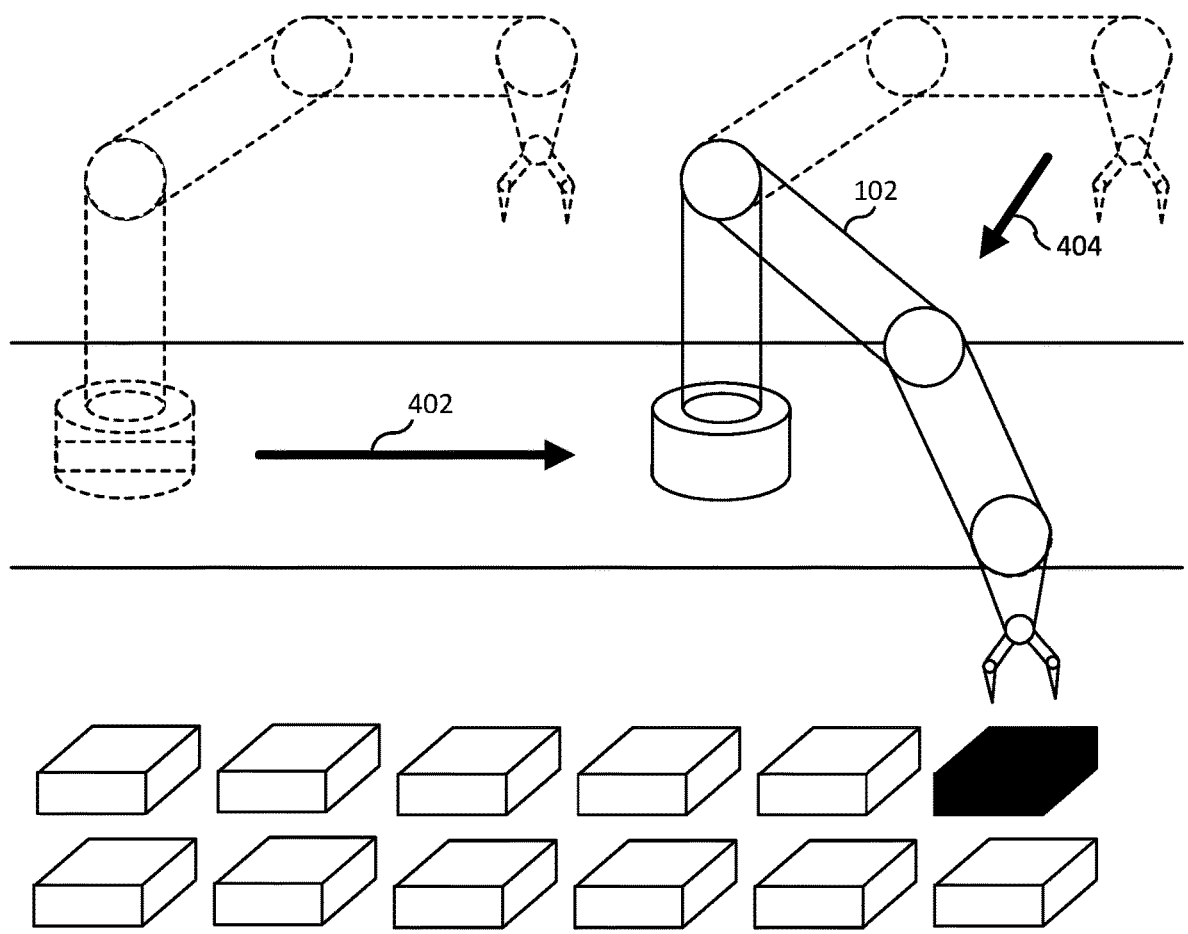
FIG. 4 is a visualization of the concept of the QoCa wireless resource allocation strategy.
Figure 8:
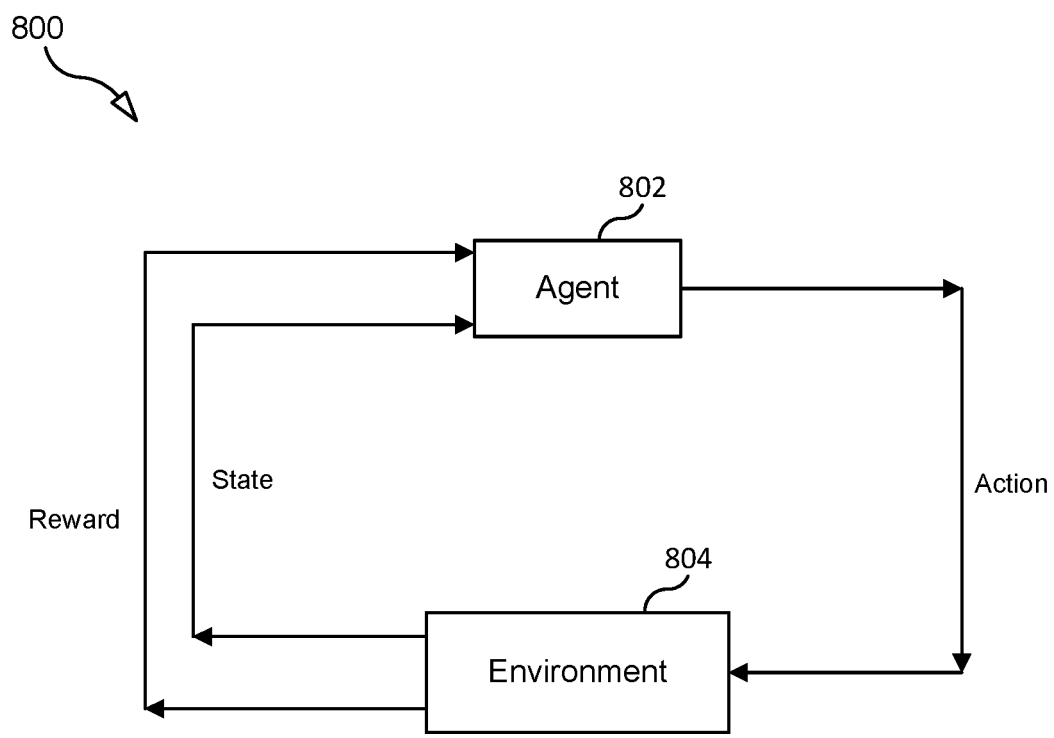
FIG. 8 shows an exemplary basic concept of RL.

FIG. 8 illustrates the basic concept of RL 800. As shown in FIG. 8, the RL 800 involves an agent 802 and an environment 804. The agent 802 may be an algorithm that takes actions (e.g., an algorithm for controlling a robot picking up an object or a drone making a delivery). The environment 804 may be the world in which the agent 802 operates. An example of the environment 804 is shown in FIG. 4.

As shown in FIG. 8, the environment 804 may take the agent 802's action and/or current state as inputs and output reward(s) and/or the agent 802's next state(s). The state may be a concrete situation in which the agent 802 finds itself. The reward may be the feedback by which the success or the failure of the agent 802's actions are measured in given state(s). Instead of a single action and a single state, a sequence of actions and states may be used as the inputs for the environment 804. Such sequence of actions and states may be referred as "trajectory."

Through the RL 800, a policy is learned. The policy can be described as a strategy that the agent 802 employs to determine the next action based on the current state (e.g., determining the action(s) that promise the highest reward).

2. Performing an RL to Build a ML Model for Controlling a Robot

RLs may be performed in a real world or a simulated world.

2.1 Finding Effective RL Policies

Finding effective policies in large-scale applications generally requires one or more of the following three factors: (1) simulations; (2) a distributed training; and (3) interactive closed-loop and open-loop control scenarios.

First, RL methods may rely on simulations to evaluate policies. The simulations allow exploring many different choices of action sequences and learning about the long-term consequences of those choices.

Second, RL algorithms may need to perform a distributed training to improve its policy based on data generated through simulations or interactions with a physical environment.

Third, policies are intended to provide solutions to control problems, and thus it is necessary to serve the policy in interactive closed-loop and open-loop control scenarios.

For RL, the RLlib framework (e.g., as described in [5]) may be used. RLlib framework supports user-defined environments with OpenAI Gym interfaces (e.g., as described in [17]). The framework provides standardized interfaces that need to be implemented.

2.2 Performing an RL in a Real World

The authors of [1] describe a learning-based approach to hand-eye coordination for robotic grasping from monocular images. To learn hand-eye coordination for grasping, they trained a large convolutional neural network to predict the probability that task-space motion of the gripper will result in successful grasps, using only monocular camera images. This requires the network to observe the spatial relationship between the gripper and objects in the scene, thus learning hand-eye coordination. They then used this network to servo the gripper in real time to achieve successful grasps. To train the network, they collected over 800,000 grasp attempts over the course of two months, using between 6 and 14 robotic manipulators at any given time, with differences in camera placement and hardware. Their experimental evaluation demonstrates that their method achieves effective real-time control, can successfully grasp novel objects, and corrects mistakes by continuous serving.

2.3 Performing RL in Real World

Regarding network simulations, authors of [2] present the ns3-gym framework. They describe its implementations and present two examples that are implemented using the ns3-gym—controlling the random access in an IEEE 802.11 mesh network and radio channel selection in a wireless multi-channel environment.

2.4 Performing RL in Simulated World

There are approaches that aim at transferring the knowledge from the simulation to the real world. The authors of [3] use RL to learn dexterous in-hand manipulation policies which can perform vision-based object reorientation on a physical 5 finger hand. The training is performed in a simulated environment in which they randomize many of the physical properties of the system like friction coefficients and an object's appearance. Their policies transfer to the physical robot despite being trained entirely in simulation as they consider the real world as a new randomized simulated environment.

Setting up custom simulation environments is supported by Rllib [5]. One way of setting up the custom simulation environments is to setup custom computation resources rather than the simulation environment that is meant to be changed.

2.5 Transferring Simulated Data to Real World

One way of helping to transfer simulated data to real world is to make the learned policy itself more adaptive during the trainings in a simulation using domain randomization. For example, the authors of [4] trains the robot in a domain-randomized simulation to estimate pose from a sequence of images.

3. Problems of Cloud and ML Based Robotic Controlling

Remotely controlling the robot 102 wirelessly from the cloud-based controller 206 is a challenging task due to some inherent characteristics of the underlying system 200.

For example, to properly control the robot 102, information (e.g., velocity commands and encoder state information) must be exchanged between the controller 206 and the robot 102 (e.g., a robotic arm) in a high frequency. The separation of the robot 102 from the controller 206, however, introduces some network delay for both sensing and actuating processes. Thus, even though the system 200 may be context-aware, have potentially higher computational performance (as compared to the conventional system 100), and be much more flexible (as compared to the conventional system 100), the system 200 needs to be properly designed to account for the characteristics of the network link between the robot 102 and the controller 206.

3.1 Network Latency

Figure 1:
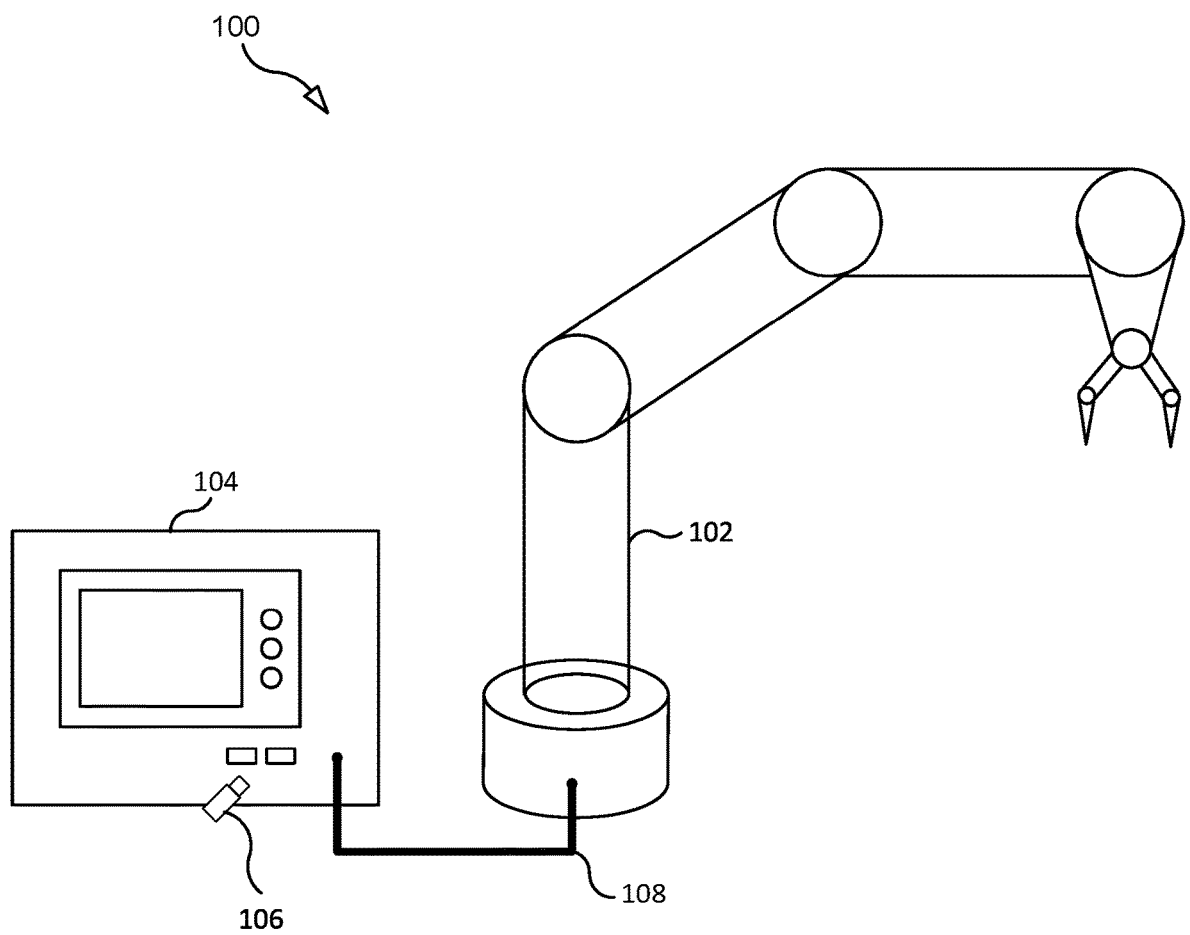
FIG. 1 shows an exemplary system for controlling a robot in Industry 3.0.
Figure 2:
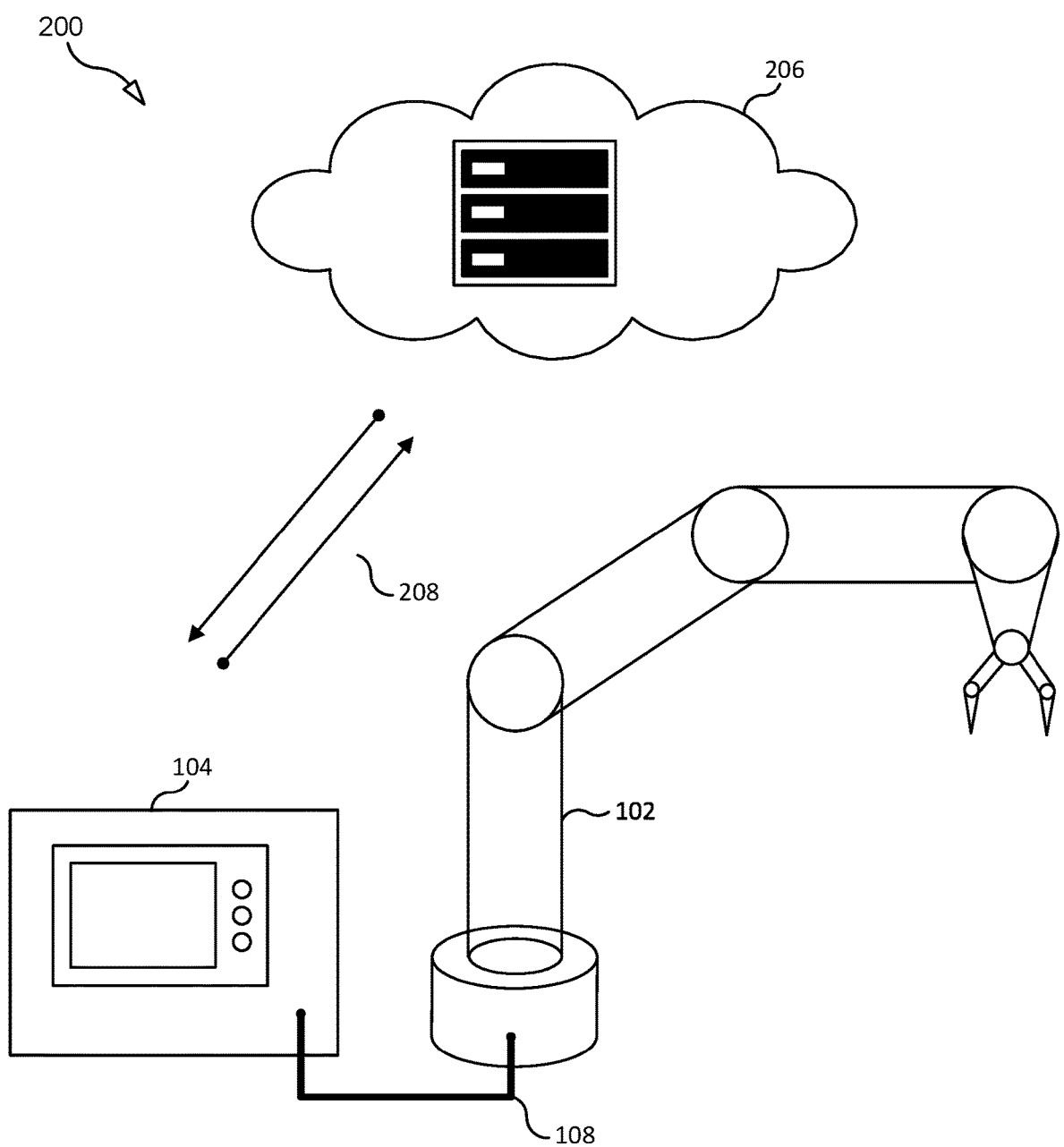
FIG. 2 shows an exemplary system for controlling a robot in Industry 4.0.
Figure 3:
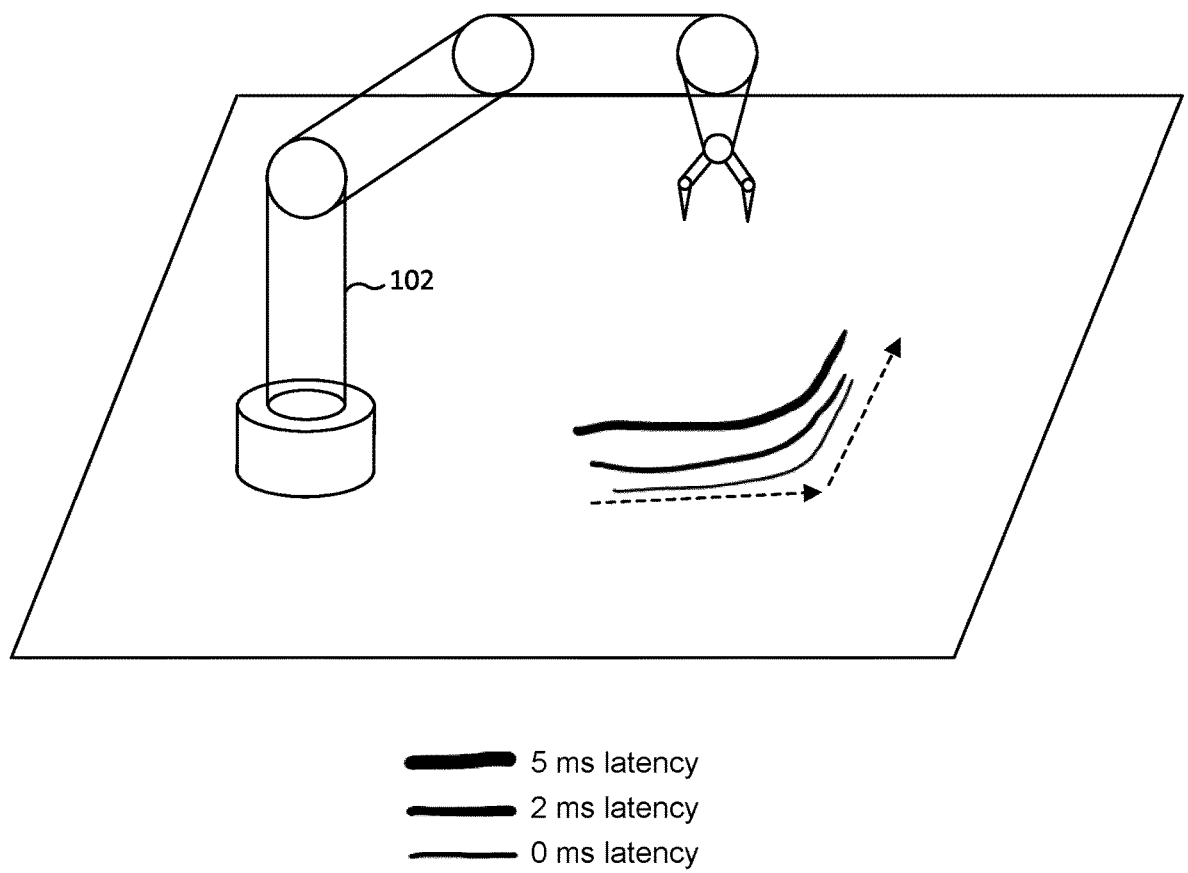
FIG. 3 shows the effects of various network latency setups on the moving paths of a robot.

FIG. 3 Shows the Effects of Various Network Latencies on the Moving Paths of the robot 102. As shown in FIG. 3, as the network latency increases, the actual moving paths of the robot 102 differ more and more from the planned (i.e., intended) moving paths.

An example of the system that simulates network effects is a Cyber-Physical Production System (CPPS) which provides a simulated robot with simulated network effects (e.g., as described in [2]).

3.2 High Cost and Difficulty of Simulations with Real Hardwares

FIG. 4 illustrates the concept of Quality of Control (QoC)-aware (QoCa) wireless resource allocation strategy that is based on the categorization of robotic arm movement phases into movements requiring high QoC and movements requiring low QoC.

Arm movements requiring low QoC (e.g., movement 402) are the ones that, while preferred, do not need to be executed with high precision. For instance, if the robot 102 (e.g., a robotic arm) merely needs to complete a task at any location within a conveyor belt, the robotic arm's exact timing of reaching the conveyor belt should not require much precision.

Arm movements requiring high QoC (e.g., movement 404) are the ones of which are parts of joint movements which need to be accurately performed in order to successfully complete required tasks. For instance, when placing a part piece on a tray or picking up a part piece from the tray that contains many part pieces, the precise position and orientation where and how the part piece is placed or picked up are more important than the speed of completing the task.

To perform the aforementioned QoC-phase identification (or any other robotic controlling method) automatically, it is important to feed RL algorithms (e.g., models) with as many trajectories as possible (e.g., by using various simulators) but also be as realistic environment as possible (e.g., when a real hardware (HW) is used for a simulation). But using real HW such as real robots and real network deployment for simulations is difficult and requires high cost.

4. Deployment Options for Robot Cell and Network Connectivity

FIG. 5 shows exemplary robot cell deployment options and network connectivity deployment options.

4.1 Robot Cell Deployment Options

In FIG. 5, the following three robot cell deployment options are provided: (1) a digital twin (DT) with a real universal robot (e.g., UR5) (e.g., as described in [6]), (2) a DT with a simulated robot (e.g., URSim) (e.g., as described in [6] and [7]), and (3) a physical simulator (e.g., as described in [8]).

A DT generally refers to a digital replica of a physical entity. In this disclosure, a DT may refer to a digital replica of a simulation environment.

4.1.1 General Similarities and/or Differences Between the Robot Cell Options

One of the main differences between the option 1 and the option 2 is whether a real universal robot or a simulated robot is used in the simulation environment. Even though both of the option 2 and the option 3 corresponds to using a simulated robot in a simulation environment, one of the main differences between the option 2 and the option 3 is the degree of the similarity between the simulated robot each option and a real robot. For example, the similarity between the simulated robot in the option 2 and the real robot is higher as compared to the similarity between the simulated robot in the option 3 and the real robot because to simulate the robot in the option 2, detailed operational data regarding a real robot is used. Such detailed operational data may be provided from the manufacturer(s) of the real robot. In some embodiments, the detailed operational data may include any one or a combination of a range of the movement of the robot 102 in each of multi-directions, a degree of movement of the robot 102 corresponding to a particular command signal, types of possible movements of the robot 102, the dimensions of the robot 102, the weight of the robot 102, the exterior material of the robot 102, a response speed of the robot 102, the maximum weight of an object the robot 102 can lift up, or the types of gripping the robot 102 can perform.

The interfaces between the robot and the DT in the robot cell deployment options 1 and 2 may be similar. For example, in both of the options 1 and 2, the robot and the DT may communicate with each other via transmission control protocol (TCP) sockets.

In the robot cell deployment option 3 (i.e., in case of the physical simulator), for the interface between the robot and the simulation environment, network latency may be added to the system via the Gazebo latency plugin (e.g., as described in [8]).

4.1.2 Real-Time Execution Requirements of the Robot Cell Options

As shown in FIG. 5, different (either robot cell or radio connectivity) deployment options may have different real-time execution requirements on the edge cloud.

The solely physical simulator option (i.e., the robot cell deployment option 3) does not require real-time execution. Thus, the combination of the physical simulator option (i.e., the robot cell deployment option 3) and the Gazebo latency plug-in (i.e., the radio connectivity deployment option 4, which also does not require real-time execution) allows handling execution at a rate that is higher as well as lower than the rate of real time execution. This combination of the options allows the workers to have the freedom to allocate high number of slow virtual machines for the simulation, thereby allowing to keep the scaling of trajectory generation for RL high or to allocate less number of fast virtual machines to finish the simulation faster than real time execution.

In case of the robot cell deployment option 1 (i.e., the option of the DT with the real universal robot (e.g., UR5)), the DT needs to be executed in real-time to ensure that velocity commands and network latency are valid in both the real world and the physical simulation (e.g., as described in [6]). The real universal robot (e.g., the UR5 hardware) performs the real-time execution of the commands in the control box, and thus further real-time execution environment in the edge cloud is not required.

In case of the robot cell deployment option 2, the DT with a simulated robot eliminates the need of a real hardware robot but stresses the edge cloud with the real-time execution requirement of the universal robot (UR) control with the simulation robot (e.g., URSim described in [7]). URSim is a simulation software intended for offline programming and simulation of both robot programs and manual movement of robot provided by the manufacturer of the UR. It is a standalone java program that provides the same interface and functionality that is available with the real hardware controller box but without the robot arm itself.

4.1.3 Levels of Realism Associated with the Robot Cell Options

The proportional—integral—derivative (PID) parameters of the controller box for the URSim are likely to be different than the ones of the Industrial robot operation system (ROS) drivers provided by UR. The variation of the PID parameters in the simulators (as compared to the real robot hardware) induces the drop of level of realism associated with a robot cell deployment option. The less real hardware (e.g., a simulated robot vs. a real robot) is used in the DT, the lower the level of realism is. The DT with the real robot (e.g., UR5) provides the highest level of realism and the solely physical simulation deployment option provides the lowest level of realism.

FIG. 5 shows that each of the robot cell deployment options is associated with a level of realism. Similarly, each of the radio connectivity deployment option is associated with a level of realism. In some embodiments of this disclosure, a level of realism associated with a particular simulation environment may be obtained based on the combination of (i) the level of realism of the robot cell deployment option associated with the particular simulation environment and (ii) the level of realism of the radio connectivity deployment option associated with the particular simulation environment.

Here, the level of realism may indicate how similar a selected simulation environment is to an actual operating environment. The level of realism may be expressed in terms of any numerical value.

The level of realism of the robot cell deployment option may indicate how similar the behavior of the robot (either simulated or actual) used in a simulation environment is to the behavior of the actual robot. For example, if a real robot (e.g., UR5) is selected as the robot cell deployment option in a simulation environment, the level of realism of the robot cell deployment option would be higher than the level of realism of the robot cell deployment option that utilizes a simulated robot.

In some embodiments, the level of realism associated with each robot cell deployment option and each radio connectivity deployment option may predefined, and the level of realism associated with a particular simulation environment may be determined based on the combination (e.g., a sum, a weighted sum, etc.) of (i) the level of realism associated with the robot cell deployment option adopted in the simulation environment and (ii) the level of realism associated with the radio connectivity deployment option adopted in the simulation environment. In other embodiments, the level of realism associated with a particular simulation environment may be predefined.

4.2 Radio Connectivity Deployment Options

There are many deployment options for the radio connectivity between a DT and a robot. In FIG. 5, the following radio connectivity deployment options are provided: (1) 5G ultra-reliable low-latency communication (URLLC); (2) a network simulator of 5G mmWave networks (e.g., as described in [9]); (3) Linux Traffic Control (e.g., as described in [10]); and (4) Gazebo latency plugin (as described in [8]).

4.2.1 Option 1

For a physical radio connection deployment option, to provide a sufficient QoS in terms of latency, a fixed resource may be assigned to critical traffic by allocating periodic timeslots in uplink and downlink to a base station and user equipment (UE) 5G prototypes. This feature is similar to the Semi-Persistent Scheduling (SPS) feature in Long Term Evolution (LTE) and 5G New Radio (NR).

The QoC switching action may be realized by selecting a low Modulation and Coding Scheme (MCS) (Quadrature Phase Shift Keying (QPSK) and 1/2 rate coding) for the high QoC phase and a high MCS (64-Quadrature Amplitude Modulation (QAM) and 2/3 rate coding) for the low QoC phase (e.g., as described in [6]). The Hybrid Automatic Repeat Request (HARQ) retransmission may be disabled for the low QoC phase. The trigger to make the switch may be realized by customized ping commands in which the content field encodes QoC phase types. The 5G prototype radio inspects transported traffic and, in case of identifying the switch request, the QoC switch may be performed.

This option may be paired up with any of the robot cell deployment options 1 and 2.

4.2.2 Option 2

Instead of using a real hardware as the radio connectivity deployment option, a detailed 5G network simulator such as the open source mmWave ns-3 module (e.g., as described in [9]) in tap bridge mode may be used. Network simulators calculate events on multiple network layers and can deliver very limited throughput even with high load on the edge cloud. This option may be paired up with any of the robot cell deployment options 1 and 2.

4.2.3 Option 3

Instead of using complex network simulators, simple model-based traffic control mechanisms (e.g., as described in [10]) may be used. The simple model-based traffic control mechanism does not make further load on the edge cloud in the network aspects. This option may be paired up with any of the robot cell deployment options 1 and 2.

4.2.4 Option 4

Another radio connectivity deployment option is simulating the effects of latency in the physical simulator itself (e.g., as described in [8]). For example, instead of simulating a network, a simple delay may be added to the transmission of data such that at least network characteristics related to transmission delays are reflected onto the simulation results. This option may not be used with other robot cell deployment options except for the physical simulator option.

Like the robot cell deployment options, the level of realism of each radio connectivity deployment option may indicate how similar the behavior of the network device (either simulated or actual) used in a simulation environment is to the behavior of the actual network device. For example, if a real network device is selected as the radio connectivity deployment option in a simulation environment, the level of realism of such simulation environment would be higher than the level of realism of the simulation environment in which a network simulator is used.

As shown in FIG. 5, as more effects in radio signal propagation, processing, and protocol layers are relaxed (e.g., not considered and/or ignored), the level of realism associated with a simulation environment decreases. For example, simulated physical layers (e.g., as described in [9]), simulated packet drops (e.g., as described in [10]), and considering only the latency (e.g., as described in [8]) decrease the level of realism associated with a simulation environment significantly.

5. Assigning the Level of Realisms to the Inputs of the RL Algorithms

As discussed above, some embodiments of this disclosure may be applied to one of the state-of-the-art reinforcement learning (RL) algorithms. For example, some embodiments may be applied to the RL algorithm—Proximal Policy Optimization (PPO) (e.g., as described in [11])—and its implementation in Ray (e.g., as shown in [12]).

The PPO performs comparably or better than other state-of-the-art approaches while being much simpler to implement and tune. The PPO's simple implementation enables focusing on improvements. Furthermore, the PPO uses simple synchronous sampling, which means that inputs (e.g., a pair of state-action or trajectories) are not buffered for later replay anywhere in the system and the PPO learner uses them once.

Figure 6:
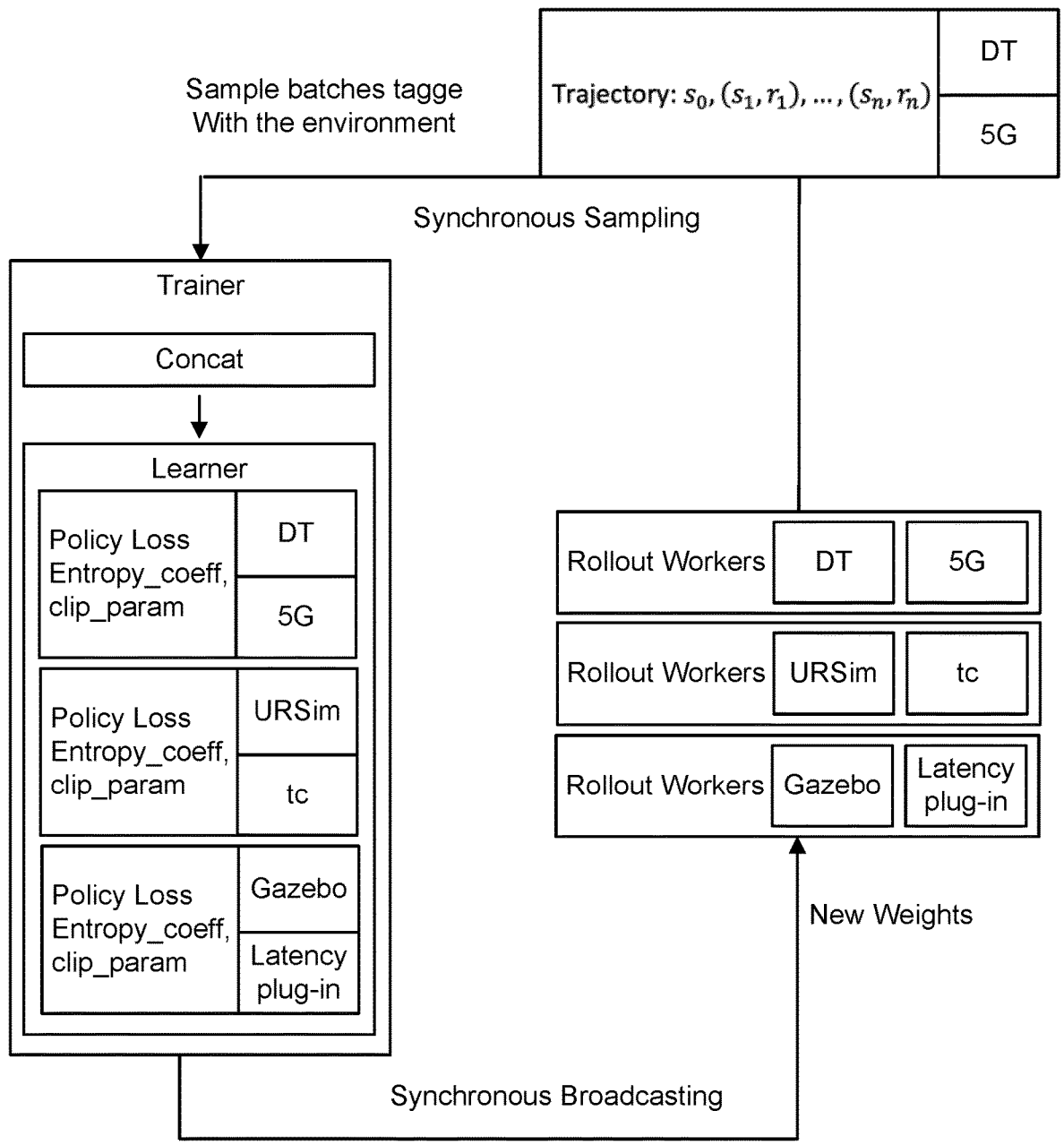
FIG. 6 shows an exemplary sampling according to some embodiments.

FIG. 6 illustrates an exemplary sampling (e.g., feeding inputs to the RL algorithm) according to some embodiments of this disclosure. The sampling shown in FIG. 6 may be a synchronous sampling used in the PPO.

As illustrated in FIG. 6, during the initialization, the working mechanisms of the rollout workers may be configured with the information of the robot cell deployment option and radio connectivity deployment option. For example, before and/or after evaluating a policy (e.g., for a RL), inputs to the trainer (e.g., the trajectories of the observations) are associated (e.g., tagged) with the information of the robot cell deployment option and the radio connectivity deployment option, and are carried to the trainer. Later, the trainer may apply environment specific policy loss functions and parameters along with this information.

In some embodiments, the information of the robot cell deployment option and the radio connectivity deployment option is a realism value representing the level of realism associated with the simulation environment in which the robot cell deployment option and the radio connectivity deployment option are adapted. The level of realism associated with a particular simulation environment may be determined based on a combination (e.g., a sum, a weighted sum, an average, a weighted average, etc.) of the level of realism associated with the robot cell deployment option and the level of realism associate with the radio connectivity deployment option.

FIG. 7 shows the modified PPO algorithm. Environment information (e.g., the information of the robot cell deployment and radio connectivity information) may be used in the surrogate function/formula to apply environment specific parameters. The following formula is an example of the extended surrogate function.

$$L^{CLIP+VF+S}_{t,E_{d_a,c_a}}(\theta) = \hat{\mathbb{E}}_t\left[\min\left(r_t(\theta)\hat{A}_t, \text{clip}\left(r_t(\theta), 1-\epsilon_{E_{d_a,c_a}}, 1+\epsilon_{E_{d_a,c_a}}\right)\hat{A}_t\right)\right. \quad (1)$$

$$-C_{1,E_{d_a,c_a}} L^{VF}_t(\theta) \quad (2)$$

$$\left.+C_{2,E_{d_a,c_a}} S[\pi_\theta](s_t)\right] \quad (3)$$

The above extended surrogate function consists of three parts: i) a clipped surrogate objective equation (1), ii) a value function estimation equation (2) and iii) policy exploration incentive equation (3).

In the equation (1), $\epsilon$ is a hyperparameter (e.g., $\epsilon=0.2$). The first term inside the min( ) is the estimated value of applying the new policy compared to the old policy weighted with the estimator of the advantage function. The second term modifies the surrogate objective by clipping the probability ratio, which removes the incentive for moving the policy update outside of the interval $[1-\epsilon, 1+\epsilon]$.

The equation (1) takes the minimum of the clipped and unclipped objective such that the final objective is a lower bound on the unclipped objective. With this scheme, the change in probability ratio is only ignored when it would make the objective to improve, and the change is included when it makes the objective worse. The tunable parameter is the clipping $\in$.

The equation (2) contains a square error of the value function update in line with the policy update. The tunable parameters are the clip parameters for the value function and the coefficient of the value function loss. Their weight can be fine-tuned with $c_1$.

The equation (3) describes the entropy of the current action distribution and its incentive can be fine-tuned with $c_2$.

The idea of introducing environment specific loss functions and parameters is applicable to other training algorithms such as DQN or IMPALA. In those training algorithms, just the parameters need to be tuned differently.

6. Evaluation of Feasibility of Implementation

The following discusses the implementation details in RLlib. The original implementation of the PPO in RLlib may be modified (e.g., as described in [12]). In the main function, the PPOTrainerDT experiment maybe setup to run.

PPOTrainerDT is a custom trainer extending PPOTrainer with custom default_policy and make_workers setup.

PPOTrainer_dt=PPOTrainer.with_updates
(name="PPOTrainer_dt",
default_policy=PPOTFPolicy_dt,
make_workers=make_workers_with_dt)

The make_workers_with_dt function is a custom environment selector which checks the worker index and modifies the environment creator. If one robot arm is used, the worker index is equal to 1 and if it is empty, it is used immediately. Otherwise, simulated environment may be used to generate trajectories.

env_chooser=lambda env_config: gym.make(config ["env"],
digital_twin=True, robot_ip=ROBOT_IP)
if env_config.worker_index==1
else env_creator(env_config)

The PPOTFPolicy_dt is a custom policy extending PPOTFPolicy with custom loss function and postprocessing function.

POTFPolicy_dt=PPOTFPolicy.with_updates
(name="PPOTFPolicy_dt",
loss_fn=ppo_surrogate_loss_dt,
postprocess_fn=postprocess_ppo_gae_dt)

The custom post processing function (postprocess_ppo_gae_dt) is the extension of postprocess_ppo_gae that gets the infos parameter from the environment and if it is running in the DT, it tags the trajectory.

The custom loss function (ppo_surrogate_loss_dt) is the extension of ppo_surrogate_loss. If the trajectory has DT tagging on it, then custom PPOLoss function is used with DT specific entropy coefficient and clip parameters. The loss function is selected with a conditional tensor operation.

return tf.cond(digital_twin,
true_fn=lambda: policy.loss_obj.loss,
false_fn=lambda: policy.loss_obj_dt.loss)

In some embodiments, if the DT mode is triggered, then the environment may receive the IP address of either the real robot or the simulated robot (e.g., the URSim). Both cases start ur_modern_driver (e.g., as described in [13]), and configures DT plugin in Gazebo (e.g., as described in [6]).

The QoC phase changes are performed in step functions of the RLlib with pyroute2 (e.g., as disclosed in [14]) and tc (e.g., as disclosed in [10]) to set a latency to the eth1 interface of docker containers running URSim instances. The docker containers are setup with the 'docker network create'} and the '--cap-add=NET\_ADMIN' capability is enabled to make the interfaces configurable by tc.

7. Evaluation of System Performance

RL may be performed with various different setups. For example, in one setup, the following configurations of workers may be used: (1) one worker operating a real robot (e.g., UR5) connected with 5G prototype radio; (2) three workers each running a simulated robot (e.g., URSim) and a network simulator (e.g., tc); and (3) three workers each running a physical simulator with latency plug-in.

In the above exemplary setup, the level of realism may be associated with the configurations of workers as follows: (1) for the simulation environment in which a real robot connected with 5G prototype radio is used, each of the PPO parameters—clip_param and vf_clip_param—may be multiplied by 1.2 (as compared to the default PPO parameters); (2) for the simulation environment in which a simulated robot and a network simulator are used, each of clip_param and vf_clip_param may be multiplied by 1.1; and (3) for the simulation environment in which a physical simulator with latency plug-in are used, each of clip_param and vf_clip_param may be multiplied by 0.5. In other words, the inputs to the RL algorithm (e.g., DT trajectories) may be considered with higher weights during the RL for the simulation environments in which the real robot or the simulated robot are used as compared to the simulation environment in which the physical simulator is used.

The KL coefficient of the type (3) workers may also be increased to stimulate more exploring with the policies.

The learned policies may be rolled out in various setups: for example, (1) learning in a simulation only, rollout in a simulated environment; (2) learning in a simulation only, rollout in a DT; (3) learning with a DT, rollout in a DT.

Figure 9:
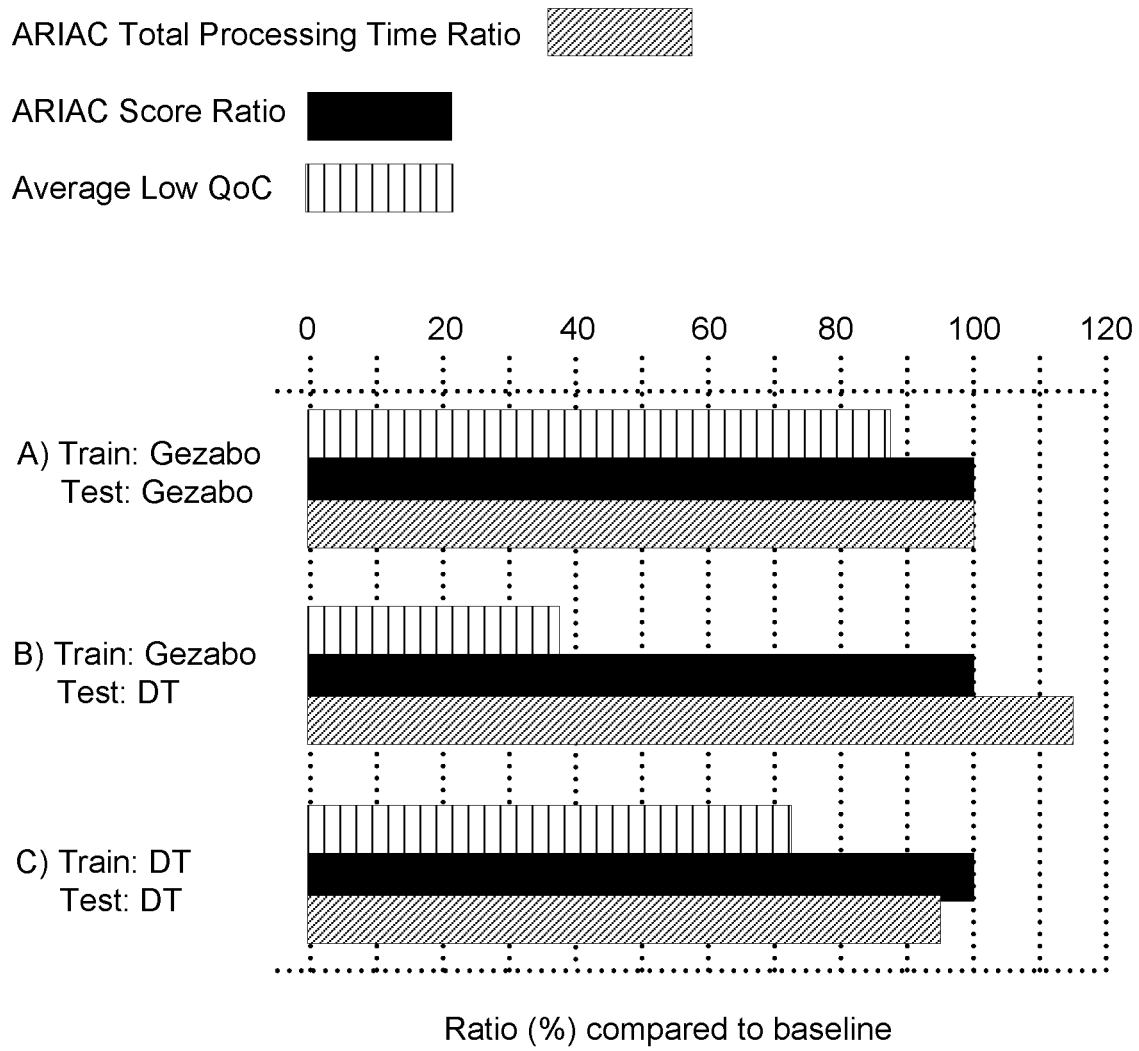
FIG. 9 shows the performance of various simulation environments.

FIG. 9 shows Agile Robotics for Industrial Automation Competition (ARIAC) scores, ARIAC total processing times (TPT), and average low QoC ratios for the three setups discussed in the preceding paragraph.

After successful learning, the ARIAC scores may remain maxima in all cases. This is due to the fact that policy could be learned and the reward function worked well.

Based on the differences among the low QoC ratios in various setups, it is possible to deduce that the setup with a real robot and a real network provides a noisier environment in total as compared to the fully simulated setup. For example, as shown in FIG. 9, the fully simulated setup (A) can achieve a 90% low QoC ratio while the fully DT setup (C) can achieve about 71% without compromising on the perfect ARIAC scores. The policy with 90% low QoC ratio trained fully in a simulation can achieve 39% low QoC ratio in the DT setup (B). The difference on the noise of the observation space is most visible in this case. Also the cost of time spent on low QoC phase can be observed in the increased TPT.

The robot controller may have to compensate on certain points more and may have to wait for a high QoC phase to do the accurate positioning. This may be the default built-in behavior of the robot controller. This may also an expected behavior that the accuracy loss of low quality network can be compensated by reducing the speed of the robot (e.g., as described in [15]). Every training may be performed for 30 k steps.

Figure 10:
FIG. 10 shows policy Kullback—Leibler (KL) coefficient in the function of training steps.
Figure 11:
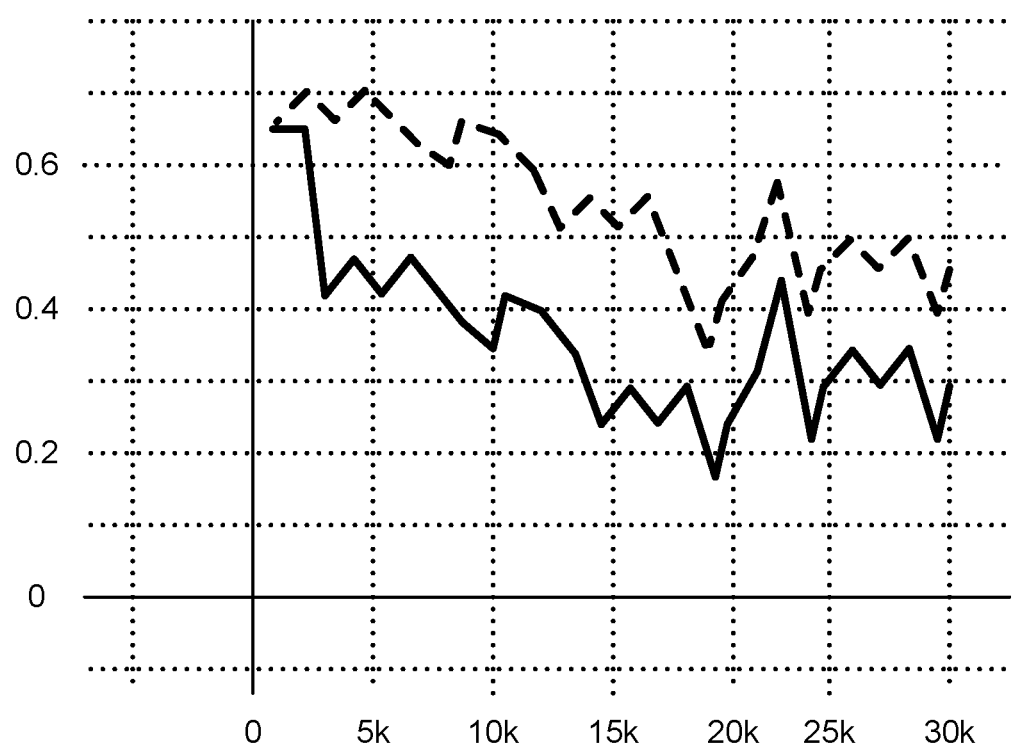
FIG. 11 shows policy entropy in the function of training steps.

FIGS. 10 and 11 show examples on the progression of Key Performance Indicators (KPIs) during learning for the baseline case (the one without trajectory tagging) and for the introduction of the level of realism case (the one with trajectory tagging). It can be seen that the introduced method does not deteriorate the learning rate.

FIG. 10 shows policy KL coefficient in the function of training steps. The dotted line corresponds to the case where trajectory is not tagged with the level of realism and the solid line corresponds to the case where trajectory is tagged with level of realism.

FIG. 11 shows policy entropy in the function of training steps. The dotted line corresponds to the case where trajectory is not tagged with the level of realism and the solid line corresponds to the case where trajectory is tagged with level of realism.

Figure 12:
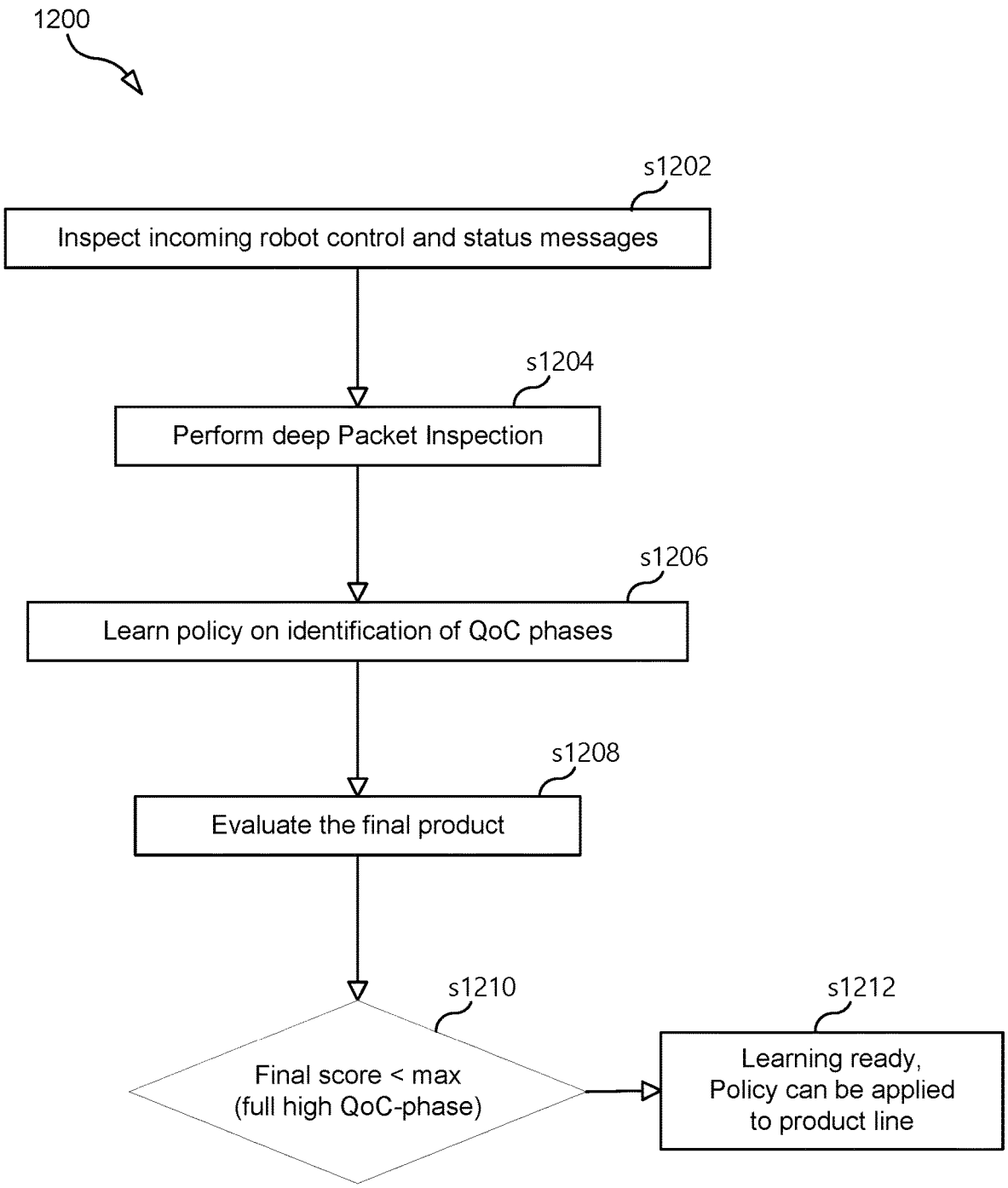
FIG. 12 shows a process according to some embodiments.

FIG. 12 shows a process of performing a machine learning (e.g., RL) according to some embodiments. The process may begin with step s1202.

The step s1202 comprises checking incoming robot control and status messages.

After checking the incoming robot control and status messages, step s1204 comprises performing deep packet inspection of the incoming robot control and status messages. In some embodiments, the deep packet inspection may comprise extracting one or more values from the messages.

After performing the deep packet inspection, step s1206 comprises learning policy on identification of QoC phases.

After performing the step s1206, step s1208 comprises evaluating the final product of the policy.

After performing the step s1208, step s1210 comprises determining whether the final evaluation score of the policy is less than a threshold (e.g., determining whether the final policy produces a good result).

If the final evaluation score of the policy less than the threshold value, then the process 1200 proceeds back to the step s1202 and a new policy is evaluated. On the other hand, if the final evaluation score of the policy is greater than or equal to the threshold value (i.e., if the final policy produces a good result), then the process 1210 proceeds to step s1212. In the step s1212, the training phase is stopped and the final policy is applied to actual production line.

Figure 13:
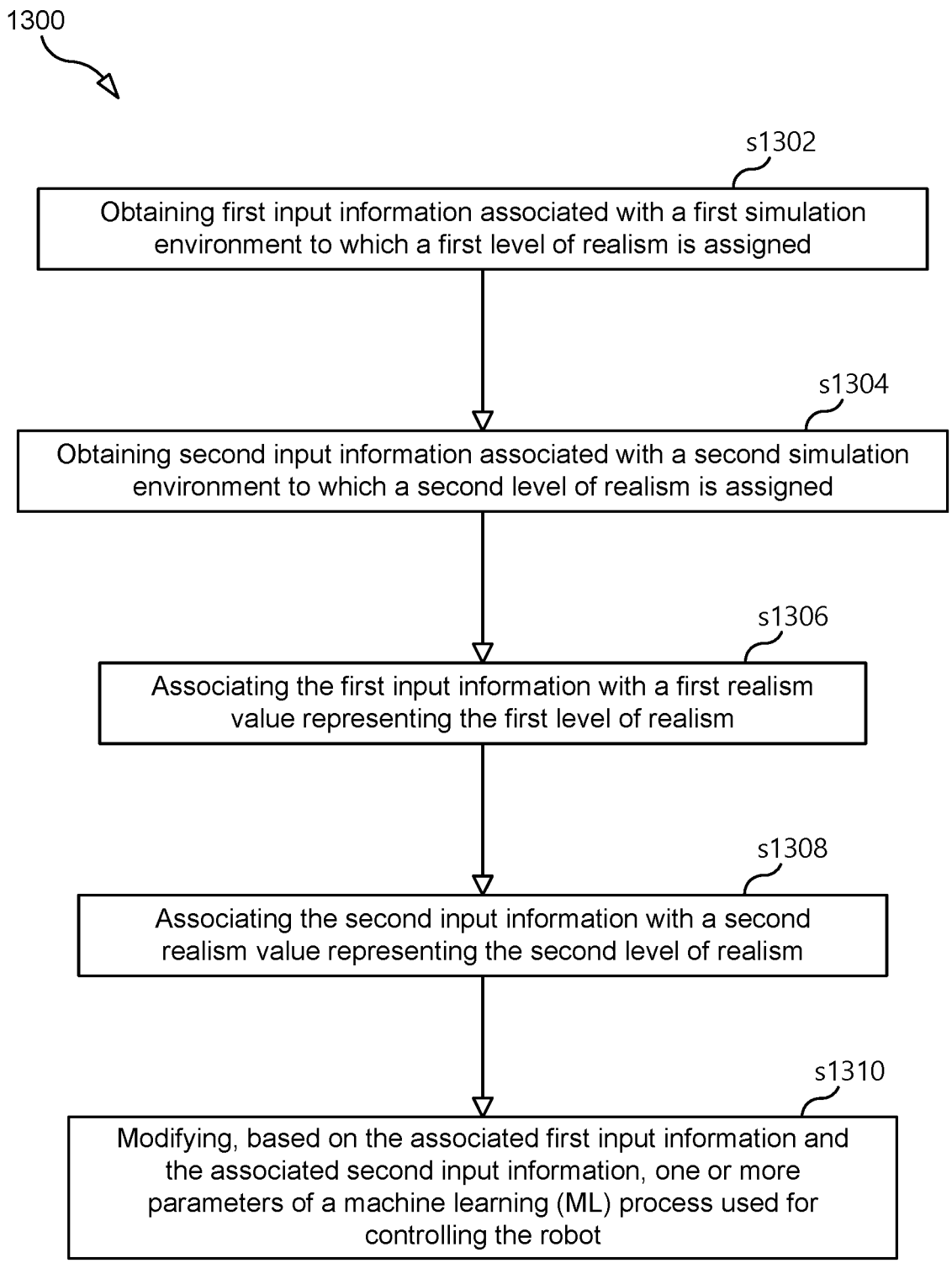
FIG. 13 shows a flow chart according to some embodiments.

FIG. 13 is a flow chart illustrating a process 1300 for controlling a robot. The process 1300 may begin with step s1302.

Step s1302 comprises obtaining first input information associated with a first simulation environment to which a first level of realism is assigned.

Step s1304 comprises obtaining second input information associated with a second simulation environment to which a second level of realism is assigned. The first level of realism is different from the second level of realism.

Step s1306 comprises associating the first input information with a first realism value representing the first level of realism.

Step s1308 comprises associating the second input information with a second realism value representing the second level of realism.

Step s1310 comprises modifying, based on the associated first input information and the associated second input information, one or more parameters of a machine learning (ML) process used for controlling the robot.

In some embodiments, the first input information and/or the second input information identifies any one or more of the type of an object manipulated by the robot, the shape of the object, the weight of the object, a destination to which the object is to be carried, a moving path along which at least a portion of the robot moved, a speed or a velocity of a movement of the robot, one or more characteristics of the robot, an arrangement of a plurality manipulable objects included in an area, or the number of the plurality of manipulable objects in the area, and the plurality of manipulable objects includes the object.

In some embodiments, each of the first simulation environment and the second simulation environment is based on a robot cell deployment selection and/or a radio connectivity selection.

In some embodiments, the robot cell deployment selection corresponds to using one of (1) a real universal robot in a digital twin environment, (2) a first simulated robot in a digital twin environment, or (3) a second simulated robot in a physical simulation environment.

In some embodiments, the first simulated robot is generated based on manufacturing data originated from a manufacturer of a real robot which the first simulated robot simulates.

In some embodiments, the radio connectivity selection corresponds to using one of (1) a real network system, (2) a network simulator simulating a real network system, (3) a network model which generates one or more effects of a real network system on signal transmission.

In some embodiments, the robot cell deployment selection is associated with a third level of realism, the radio connectivity selection is associated with a fourth level of realism, and the first level of realism and/or the second level of realism is determined based on the third level of realism and the fourth level of realism.

In some embodiments, the ML process is a reinforcement learning (RL) process.

In some embodiments, modifying said one or more parameters of the ML process comprises multiplying said one or more parameters of the ML process by a first group of one or more weights or a second group of one or more weights, the first group of one or more weights is associated with the first level of realism, and the second group of one or more weights is associated with the second level of realism.

In some embodiments, the robot is a real physical robot or a simulated robot implemented in a computer software.

Figure 14:
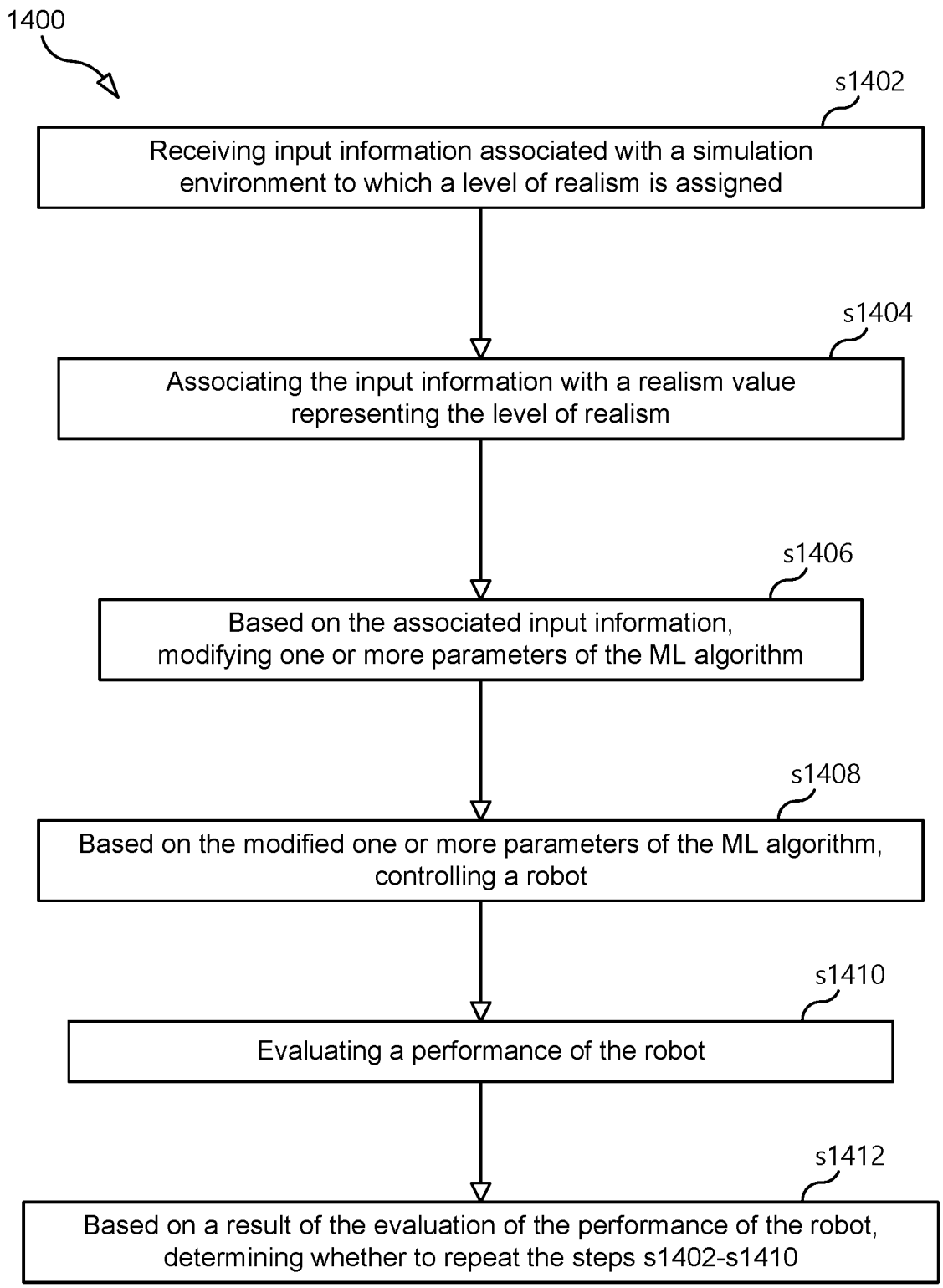
FIG. 14 shows a flow chart according to some embodiments.

FIG. 14 is a flow chart illustrating a process 1400 for training a machine learning (ML) algorithm. The process 1400 may begin with step s1402.

Step s1402 comprises receiving input information associated with a simulation environment to which a level of realism is assigned.

Step s1404 comprises associating the input information with a realism value representing the level of realism.

Step s1406 comprises based on the associated input information, modifying one or more parameters of the ML algorithm.

Step s1408 comprises based on the modified one or more parameters of the ML algorithm, controlling a robot.

Step s1410 comprises evaluating a performance of the robot.

Step s1412 comprises based on a result of the evaluation of the performance of the robot, determining whether to repeat the steps s1402-s1410.

In some embodiments, the ML algorithm is a reinforcement learning (RL) algorithm.

Figure 15:
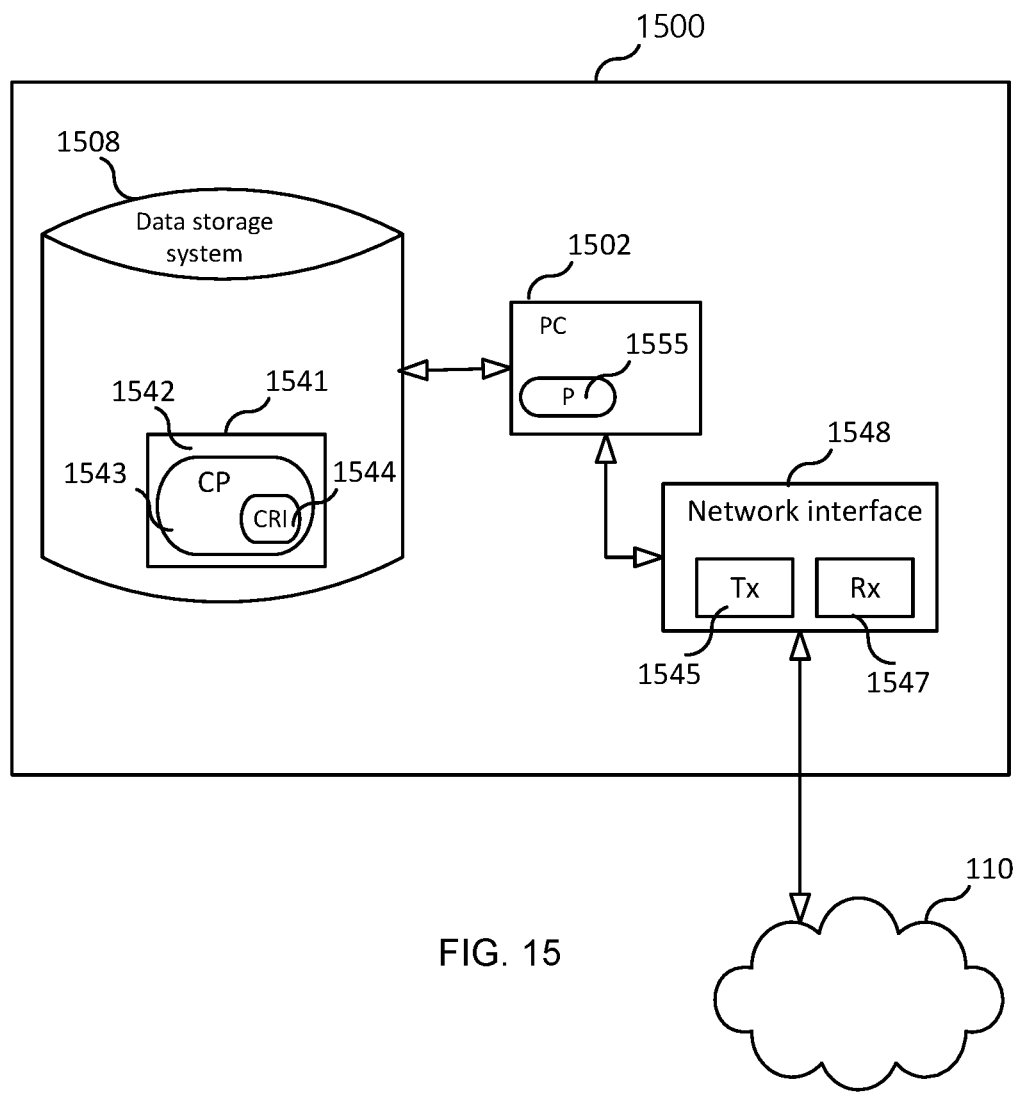
FIG. 15 shows an apparatus according to some embodiments.

FIG. 15 is a block diagram of an apparatus 1500, according to some embodiments, for implementing any of the methods disclosed. As shown in FIG. 15, apparatus 1500 may comprise: processing circuitry (PC) 1502, which may include one or more processors (P) 1555 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., apparatus 1500 may be a distributed computing apparatus); a network interface 1548 comprising a transmitter (Tx) 1545 and a receiver (Rx) 1547 for enabling apparatus 1300 to transmit data to and receive data from other nodes connected to a network 110 (e.g., an Internet Protocol (IP) network) to which network interface 1548 is connected (directly or indirectly) (e.g., network interface 1548 may be wirelessly connected to the network 110, in which case network interface 1548 is connected to an antenna arrangement); and a local storage unit (a.k.a., "data storage system") 1508, which may include one or more non-volatile storage devices and/or one or more volatile storage devices. In embodiments where PC 1502 includes a programmable processor, a computer program product (CPP) 1541 may be provided. CPP 1541 includes a computer readable medium (CRM) 1542 storing a computer program (CP) 1543 comprising computer readable instructions (CRI) 1544. CRM 1542 may be a non-transitory computer readable medium, such as, magnetic media (e.g., a hard disk), optical media, memory devices (e.g., random access memory, flash memory), and the like. In some embodiments, the CRI 1544 of computer program 1543 is configured such that when executed by PC 1502, the CRI causes apparatus 1500 to perform steps described herein (e.g., steps described herein with reference to the flow charts). In other embodiments, apparatus 1500 may be configured to perform steps described herein without the need for code. That is, for example, PC 1502 may consist merely of one or more ASICs. Hence, the features of the embodiments described herein may be implemented in hardware and/or software.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes and message flows described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

| | References |
|---|---|
| 1. | Levine, P. Pastor, A. Krizhevsky, and D. Quillen, "Learning Hand-Eye Coordination for Robotic Grasping with Deep Learning and Large-Scale Data Collection," CoRR, vol. abs/1603.02199, 2016. Available: http://arxiv.org/abs/1603.02199 |
| 2. | P. Gawlowicz and A. Zubow, "ns3-gym: Extending OpenAI Gym for Networking Research," CoRR, vol. abs/1810.03943, 2018. [Online]. Available: http://arxiv.org/abs/1810.03943 |
| 3. | OpenAI and M. A. et. al, "Learning Dexterous In-Hand Manipulation," CoRR, vol. abs/1808.00177, 2018. [Online]. Available: http://arxiv.org/abs/1808.00177 |
| 4. | X. Ren, J. Luo, E. SolowjoW, J. A. Ojea, A. Gupta, A. Tamar, and P. Abbeel, "Domain randomization for active pose estimation," in 2019 International Conference on Robotics and Automation (ICRA), 2019, pp. 7228-7234. |
| 5. | P. Moritz, R. Nishihara, S. Wang, A. Tumanov, R. Liaw, E. Liang, M. Elibol, Z. Yang, W. Paul, M. I. Jordan, and I. Stoica, "Ray: A Distributed Framework for Emerging AI Applications," in $13^{th}$ USENIX Symposium on Operating Systems Design and Implementation (OSDI 18). Carlsbad, CA: USENIX Association, October 2018, pp. 561-577. [Online]. Available: https://www.usenix.org/conference/osdi18/presentation/moritz |
| 6. | G. Szabo, S. Racz, N. Reider, and J. Peto, "Digital twin: Network provisioning of mission critical communication in cyber physical production systems," In Proc., The IEEE International Conference on Industry 4.0, Artificial Intelligence, and Communications Technology, Jul. 2019. |
| 7. | "URSim," 2019. [Online]. Available: https://www.universal-robots.com/download/?option=28545#section16632 |
| 8. | G. Szabo, S. Racz, J. Peto, and R. R. Aschoff, "On The Effects of The Variations In Network Characteristics In Cyber Physical Systems," In Proc., 31st European Simulation and Modelling Conference, Oct. 2017. |
| 9. | M. Mezzavilla, M. Zhang, M. Polese, R. Ford, S. Dutta, S. Rangan, and M. Zorzi, "End-to-end simulation of 5 g mm wave networks," IEEE Communications Surveys Tutorials, vol. 20, no. 3, pp. 2237-2263, thirdquarter 2018. |
| 10. | "Show/manipulate traffic control settings," 2019. [Online]. Available: http://man7.org/linux/man-pages/man8/tc.8.html |
| 11. | J. Schulman, F. Wolski, P. Dhariwal, A. Radford, and O. Klimov, "Proximal policy optimization algorithms," CoRR, vol. abs/1707.06347, 2017. |
| 12. | "PPO implementation in RLlib," 2020. [Online]. Available: https://github.com/ray-project/ray/blob/master/rllib/agents/ppo/ppo.py |
| 13. | "UR modern driver," 2020. [Online]. Available: https://github.com/ros-industrial/ur_modern_driver |

| | References |
|---|---|
| 14. | "pyroute2," 2020. [Online]. Available: https://pypi.org/project/pyroute2/ |
| 15. | S. Racz, G. Szabo, and J. Peto, "Performance evaluation of closed-loop industrial applications over imperfect networks," Infocommunications Journal, vol. 11, no. 2, pp. 32-28, June 2019. |
| 16. | "ARIAC scoring," 2019. [Online]. Available: https://bitbucket.org/osrf/ariac/wiki/2019/scoring |
| 17. | G. B. et al., "Openai gym," CoRR, vol. abs/1606.01540, 2016. [Online]. Available: http://arxiv.org/abs/1606.01540 |

The invention claimed is:

1. A method for controlling a robot, the method comprising:
  assigning a first level of realism to a first simulation environment;
  assigning a second level of realism to a second simulation environment;
  obtaining first input information associated with the first simulation environment to which the first level of realism is assigned;
  obtaining second input information associated with the second simulation environment to which the second level of realism is assigned, wherein the first level of realism is different from the second level of realism;
  associating the first input information with a first realism value representing the first level of realism;
  associating the second input information with a second realism value representing the second level of realism;
  modifying one or more parameters of a machine learning (ML) process used for controlling the robot based on:
    (i) the first input information;
    (ii) the second input information;
    (iii) the first realism value representing the first level of realism; and
    (iv) the second realism value representing the second level of realism; and
  controlling the robot based on the modified one or more parameters of the ML process.

2. The method of claim 1, wherein
  the first input information and/or the second input information identifies any one or more of: the type of an object manipulated by the robot, the shape of the object, the weight of the object, a destination to which the object is to be carried, a moving path along which at least a portion of the robot moved, a speed or a velocity of a movement of the robot, one or more characteristics of the robot, an arrangement of a plurality manipulable objects included in an area, or the number of the plurality of manipulable objects in the area, and
  the plurality of manipulable objects includes the object.

3. The method of claim 1, wherein each of the first simulation environment and the second simulation environment is based on a robot cell deployment selection and/or a radio connectivity selection.

4. The method of claim 3, wherein the robot cell deployment selection corresponds to using one of (1) a real universal robot in a digital twin environment, (2) a first simulated robot in a digital twin environment, or (3) a second simulated robot in a physical simulation environment.

5. The method of claim 4, wherein the first simulated robot is generated based on manufacturing data originated from a manufacturer of a real robot which the first simulated robot simulates.

6. The method of claim 3, wherein the radio connectivity selection corresponds to using one of (1) a real network system, (2) a network simulator simulating a real network system, (3) a network model which generates one or more effects of a real network system on signal transmission.

7. The method of claim 3, wherein
  the robot cell deployment selection is associated with a third level of realism,
  the radio connectivity selection is associated with a fourth level of realism, and
  the first level of realism and/or the second level of realism is determined based on the third level of realism and the fourth level of realism.

8. The method of claim 1, wherein the ML process is a reinforcement learning (RL) process.

9. The method of claim 8, wherein
  modifying said one or more parameters of the ML process comprises multiplying said one or more parameters of the ML process by a first group of one or more weights or a second group of one or more weights,
  the first group of one or more weights is associated with the first realism value, and
  the second group of one or more weights is associated with the second realism value.

10. The method of claim 1, wherein the robot is a real physical robot or a simulated robot implemented in a computer software.

11. A method for training a machine learning (ML) algorithm, the method comprising:
  (i) assigning a level of realism to a simulation environment;
  (ii) receiving input information associated with the simulation environment to which the level of realism is assigned;
  (ii) associating the input information with a realism value representing the level of realism;
  (iii) modifying one or more parameters of the ML algorithm based on the input information and the realism value;
  (iv) controlling, based on the modified one or more parameters of the ML algorithm, a robot;
  (v) evaluating a performance of the robot; and
  (vi) determining, based on a result of the evaluation of the performance of the robot, whether to repeat the steps (i)-(v).

12. The method of claim 11, wherein the ML algorithm is a reinforcement learning (RL) algorithm.

13. An apparatus for controlling a robot, the apparatus comprising:
  a memory; and
  processing circuitry coupled to the memory, wherein the apparatus is configured to:

assign a first level of realism to a first simulation environment;
assign a second level of realism to a second simulation environment;
obtain first input information associated with the first simulation environment to which the first level of realism is assigned;
obtain second input information associated with the second simulation environment to which the second level of realism is assigned, wherein the first level of realism is different from the second level of realism;
associate the first input information with a first realism value representing the first level of realism;
associate the second input information with a second realism value representing the second level of realism;
modify one or more parameters of a machine learning (ML) process used for controlling the robot based on:
(i) the first input information;
(ii) the second input information;
(iii) the first realism value representing the first level of realism; and
(iv) the second realism value representing the second level of realism; and
control the robot based on the modified one or more parameters of the ML process.

14. An apparatus for training a machine learning (ML) algorithm, the apparatus comprising:
a memory; and
processing circuitry coupled to the memory, wherein the apparatus is configured to:
(i) assign a level of realism to a simulation environment;
(ii) receive input information associated with the simulation environment to which the level of realism is assigned;
(ii) associate the input information with a realism value representing the level of realism;
(iii) modify one or more parameters of the ML algorithm based on the input information and the realism value;
(iv) control, based on the modified one or more parameters of the ML algorithm, a robot;
(v) evaluate a performance of the robot; and
(vi) determine, based on a result of the evaluation of the performance of the robot, whether to repeat the steps (i)-(v).

15. The apparatus of claim 13, wherein
the first input information and/or the second input information identifies any one or more of: the type of an object manipulated by the robot, the shape of the object, the weight of the object, a destination to which the object is to be carried, a moving path along which at least a portion of the robot moved, a speed or a velocity of a movement of the robot, one or more characteristics of the robot, an arrangement of a plurality manipulable objects included in an area, or the number of the plurality of manipulable objects in the area, and
the plurality of manipulable objects includes the object.

16. The apparatus of claim 13, wherein
each of the first simulation environment and the second simulation environment is based on a robot cell deployment selection and/or a radio connectivity selection, and
the robot cell deployment selection corresponds to using one of (1) a real universal robot in a digital twin environment, (2) a first simulated robot in a digital twin environment, or (3) a second simulated robot in a physical simulation environment.

17. The apparatus of claim 16, wherein the first simulated robot is generated based on manufacturing data originated from a manufacturer of a real robot which the first simulated robot simulates.

18. The apparatus of claim 16, wherein the radio connectivity selection corresponds to using one of (1) a real network system, (2) a network simulator simulating a real network system, (3) a network model which generates one or more effects of a real network system on signal transmission.

19. The apparatus of claim 16, wherein
the robot cell deployment selection is associated with a third level of realism,
the radio connectivity selection is associated with a fourth level of realism, and
the first level of realism and/or the second level of realism is determined based on the third level of realism and the fourth level of realism.

20. The apparatus of claim 13, wherein
modifying said one or more parameters of the ML process comprises multiplying said one or more parameters of the ML process by a first group of one or more weights or a second group of one or more weights,
the first group of one or more weights is associated with the first level of realism, and
the second group of one or more weights is associated with the second level of realism.

* * * * *